United States Patent
Burke (10) Patent No.: US 11,285,884 B2
(45) Date of Patent: Mar. 29, 2022

(54) STORAGE RACK ASSEMBLIES FOR VEHICLE TAILGATES

(71) Applicant: Toyota Motor Engineering & Manufacturing North America, Inc., Plano, TX (US)

(72) Inventor: David M. Burke, Farmington, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/942,449

(22) Filed: Jul. 29, 2020

(65) Prior Publication Data
US 2022/0032854 A1 Feb. 3, 2022

(51) Int. Cl.
*B60R 9/10* (2006.01)
*B62D 33/02* (2006.01)
*B60R 9/06* (2006.01)

(52) U.S. Cl.
CPC .................. *B60R 9/10* (2013.01); *B60R 9/06* (2013.01); *B62D 33/0207* (2013.01)

(58) Field of Classification Search
CPC .............. B62D 33/027; B62D 33/0276; B62D 33/0273; B62D 33/03; B60R 3/02; B60R 11/06; B60R 2011/004
See application file for complete search history.

(56) References Cited

U.S. PATENT DOCUMENTS

| | | | |
|---|---|---|---|
| 6,942,272 B2 * | 9/2005 | Livingston | B60R 3/02 296/57.1 |
| 6,994,363 B2 * | 2/2006 | Seksaria | B60P 3/40 280/166 |
| 10,011,237 B1 | 7/2018 | Phillips | |
| 10,994,660 B2 * | 5/2021 | Ngo | B62D 33/03 |
| 2011/0064535 A1 * | 3/2011 | Tardif | B60P 7/0807 410/100 |

(Continued)

FOREIGN PATENT DOCUMENTS

| CA | 2757893 A1 | 5/2012 |
|---|---|---|
| DE | 10308062 A1 | 9/2004 |

(Continued)

OTHER PUBLICATIONS

Kuat hitch bike racks (https://www.etrailer.com/Hitch-Bike-Racks/Toyota/Tacoma/2019/NV22G.html), accessed May 29, 2020, 21 pages.

(Continued)

*Primary Examiner* — Corey N Skurdal
(74) *Attorney, Agent, or Firm* — Dinsmore & Shohl LLP (57) ABSTRACT

A storage rack assembly including a tailgate having a recess formed on an interior surface thereof, and a storage rack. The storage rack includes a crossbar, and a pair of support arms having a first end attached to the crossbar and an opposite second end pivotally attached to the interior surface of the tailgate. The pair of support arms are provided on opposite ends of the crossbar. The storage rack is positionable between a stowed position in which the crossbar and the pair of support arms are positioned within the recess of the tailgate, and a use position in which the crossbar and the pair of support arms are positioned out of the recess of the tailgate.

13 Claims, 4 Drawing Sheets

(56) References Cited

U.S. PATENT DOCUMENTS

2015/0014502 A1  1/2015  Mccaughan
2018/0099619 A1  4/2018  Yanez et al.

FOREIGN PATENT DOCUMENTS

DE  102007024953 A1  12/2008
GB       2511502 B    8/2017
GB       2523824 B   12/2017

OTHER PUBLICATIONS

Top line truck bed expander—black (https://www.truckaccessorizer.com/Topline-Truck-Bed-Expander-BX400402.html), accessed May 29, 2020, 2 pages.

* cited by examiner

STORAGE RACK ASSEMBLIES FOR VEHICLE TAILGATES

TECHNICAL FIELD

The present specification generally relates to storage racks for supporting objects on a vehicle tailgate and, more specifically, folding storage racks for supporting at least one object, such as a bicycle, on a vehicle tailgate.

BACKGROUND

Vehicles may be equipped to receive and secure a storage rack onto a rear door, tailgate, or trailer hitch thereof to secure objects such as, for example, bicycles, fishing poles, golf clubs, and the like. However, these racks may take up significant space on or within the vehicle and, thus, hinder a rear view out of the vehicle. As a result, many of these racks are meant to be removed after each use. This requires reattaching the rack each time objects are to be secured and transported. Even some racks that may be foldable or otherwise collapsible still take up significant space within the vehicle, such as a cargo space or truck bed, and inhibit storage of cargo even when the rack is in a folded position.

Accordingly, a need exists for improved racks, such as a storage rack, that are configured to be stowable to reduce the amount of space being occupied when the racks are not in use.

SUMMARY

In one embodiment, a storage rack assembly includes a tailgate having a recess formed on an interior surface thereof, and a storage rack including a crossbar and a pair of support arms. The pair of support arms have a first end attached to the crossbar and an opposite second end pivotally attached to the interior surface of the tailgate. The pair of support arms are provided on opposite ends of the crossbar. The storage rack is positionable between a stowed position in which the crossbar and the pair of support arms are positioned within the recess of the tailgate, and a use position in which the crossbar and the pair of support arms are positioned out of the recess of the tailgate.

The storage rack assembly may include at least one locking arm having a first end pivotally attached to at least one of the crossbar and the pair of support arms, and an opposite second end. The at least one locking arm is positionable between a folded position, an upright position, and a support position. When the locking arm is in the support position, the locking arm is operable between an unlocked state in which the second end of the at least one locking arm is unlocked to the tailgate, and a locked state in which the second end of the at least one locking arm is locked to the tailgate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a storage rack assembly including a tailgate having a recess formed on an interior surface of the tailgate, and a storage rack. The storage rack includes a crossbar and a pair of support arms provided on opposite ends of the crossbar. Each support arm has a first end attached to the crossbar and an opposite second end pivotally attached to the interior surface of the tailgate. The storage rack is positionable between a stowed position in which the crossbar and the pair of support arms are positioned within the recess of the tailgate and in a folded position, and a use position in which the crossbar and the pair of support arms are positioned out of the recess of the tailgate and in an unfolded position. The storage rack is configured to support at least one object such as, for example, a bicycle, when in the use position. As such, the storage rack may be used as a bicycle rack for supporting a bicycle on the tailgate of a vehicle. The storage rack is stowable within the tailgate when in the stowed position. Although the storage rack is discussed herein as securing and support a bicycle on a vehicle, it should be appreciated that the storage rack may be suitable for supporting additional objects such as, for example, fishing poles, golf clubs, and the like, without departing from the scope of the present disclosure.

Figure 1:
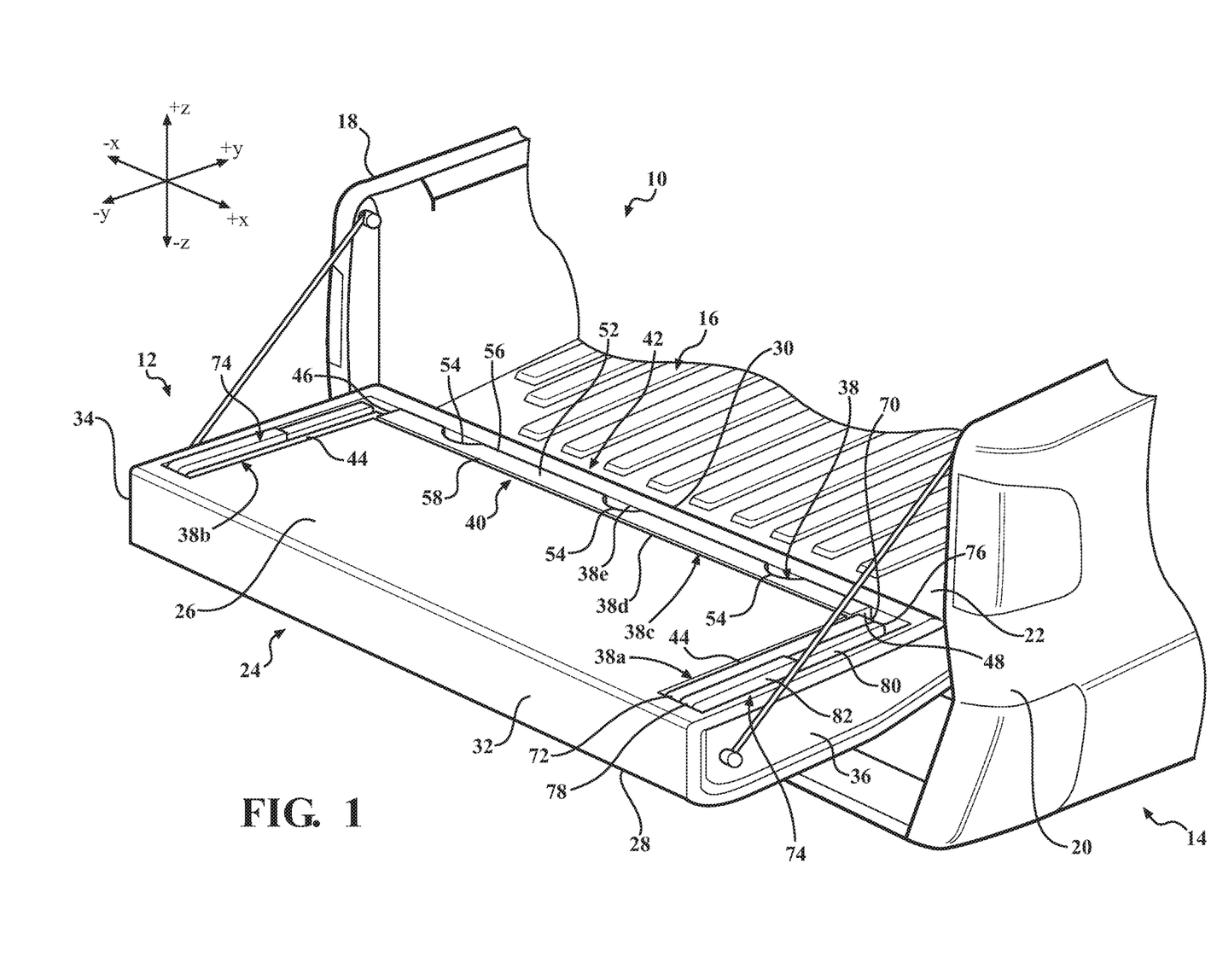
FIG. 1 schematically depicts a perspective view of a storage rack in a stowed position on an interior surface of a tailgate in an open position according to one or more embodiments shown and described herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward" as used herein refers to the relative location of a component with respect to a vehicle centerline.

The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Various embodiments of the storage rack assembly and the operation of the storage rack assembly are described in more detail herein. Whenever possible, the same reference numerals will be used throughout the drawings to refer to the same or like parts.

Referring now to FIG. 1, a rear portion of a vehicle 10 is illustrated including a storage rack assembly 12 according to one or more embodiments described herein. As illustrated herein, the vehicle 10 is depicted as a pickup truck having a vehicle body 14. The vehicle body 14 has a cargo space 16, such as a truck bed for storing cargo, defined by at least a first side panel 18, a second side panel 20, and a floor 22. The first side panel 18 and the second side panel 20 are spaced apart from one another in the vehicle lateral direction on opposite sides of the cargo space 16. A tailgate 24 of the storage rack assembly 12 is pivotally attached to the vehicle body 14 of the vehicle 10 and operable between an open position and a closed position to open and close and end of the cargo space 16, respectively. In some embodiments, the tailgate 24 is pivotally attached to the floor 22 of the vehicle body 14 or pivotally attached to the first side panel 18 and the second side panel 20 to rotate about an axis extending in the vehicle lateral direction. In some embodiments, the tailgate 24 may be pivotally attached to either of the first side panel 18 or the second side panel 20 such that the tailgate 24 rotates about an axis extending in the vehicle vertical direction. It should be appreciated that, although the vehicle 10 is depicted herein as a pickup truck including a tailgate 24, the present disclosure is not limited to such a vehicle. As such, the present disclosure may be utilized with any other suitable vehicle in which the tailgate 24 is a pivotable rear door that opens and closes access to a cargo space of the vehicle, such as a back seat area or trunk.

Figure 3:
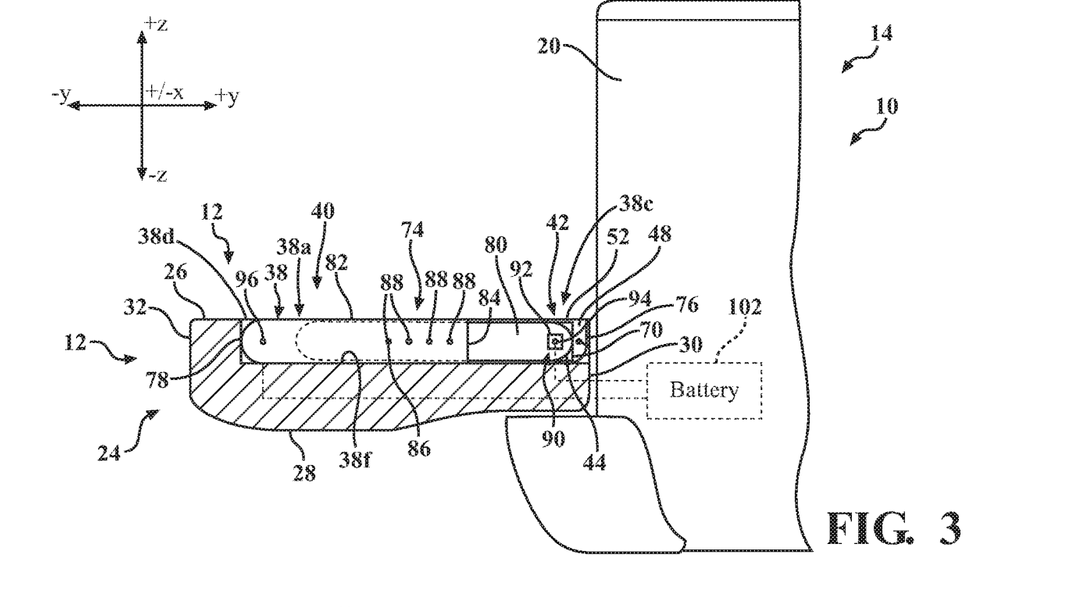
FIG. 3 schematically depicts a cross-sectional view of the storage rack in the stowed position according to one or more embodiments shown and described herein.
Figure 4:
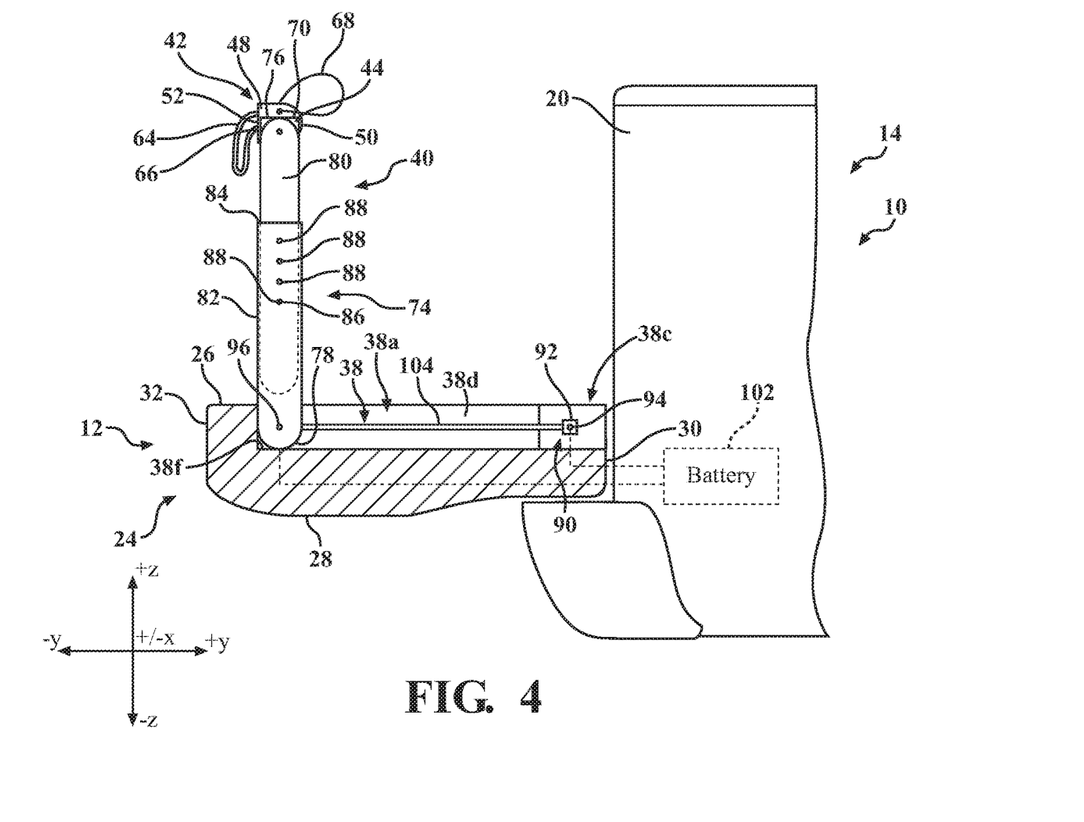
FIG. 4 schematically depicts a cross-sectional view of the storage rack in an intermediate position, the support arms in the unfolded position, and the locking arm in an upright position according to one or more embodiments shown and described herein.
Figure 5:
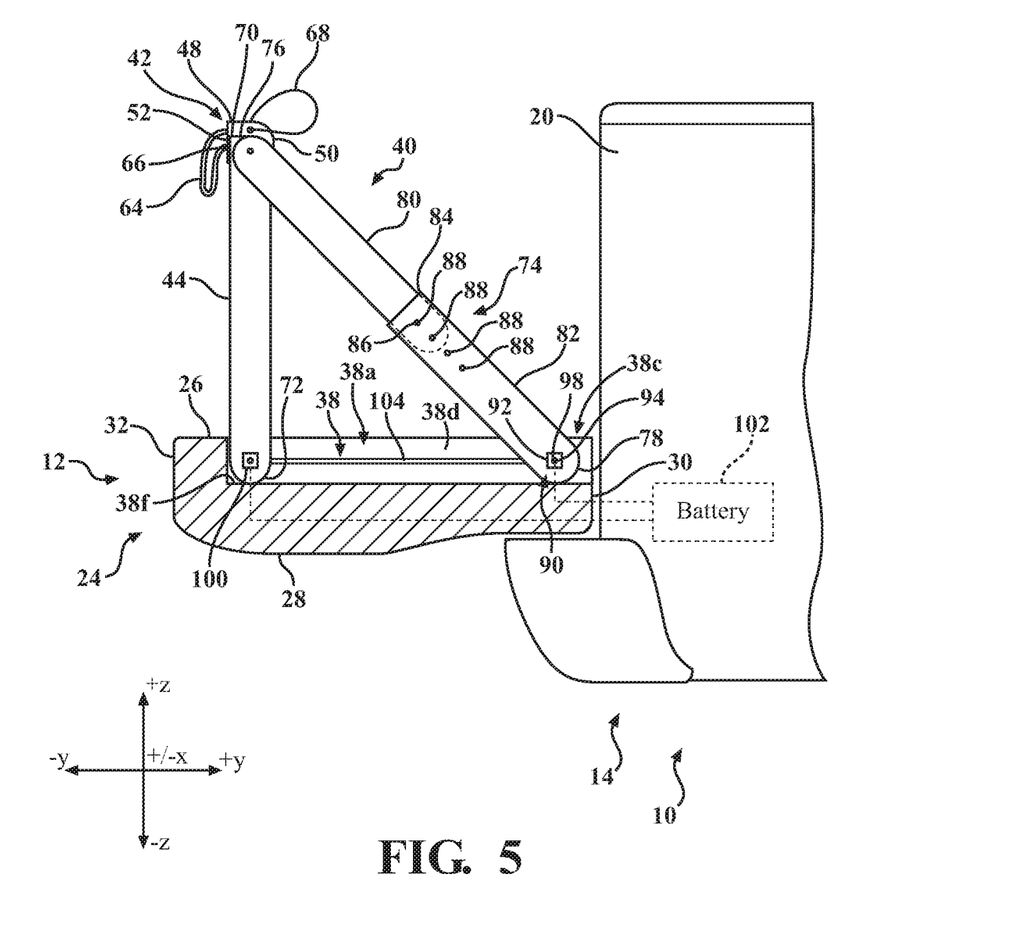
FIG. 5 schematically depicts a cross-sectional view of the storage rack in the use position, the support arms in the unfolded position, and the locking arm in the support position according to one or more embodiments shown and described herein.

The tailgate 24 includes an interior surface 26 facing the cargo space 16 when in the closed position, an opposite exterior surface 28, a lower end 30 proximate the floor 22 of the vehicle body 14, an opposite upper end 32, a first side 34 proximate the first side panel 18 when in the closed position, and an opposite second side 36 proximate the second side panel 20 when in the closed position. The interior surface 26 of the tailgate 24 has a recess 38 formed therein. The recess 38 has a generally U-shape with a pair of side portions 38a. 38b and a traversing portion 38c extending between the side portions 38a, 38b. The recess 38 is defined by a pair of side walls 38d, 38e, and a bottom wall 38f, as shown in FIGS. 3-5. A thickness of the recess 38 is defined by a distance between the bottom wall 38f of the recess 38 and the interior surface 26 of the tailgate 24.

Figure 2:
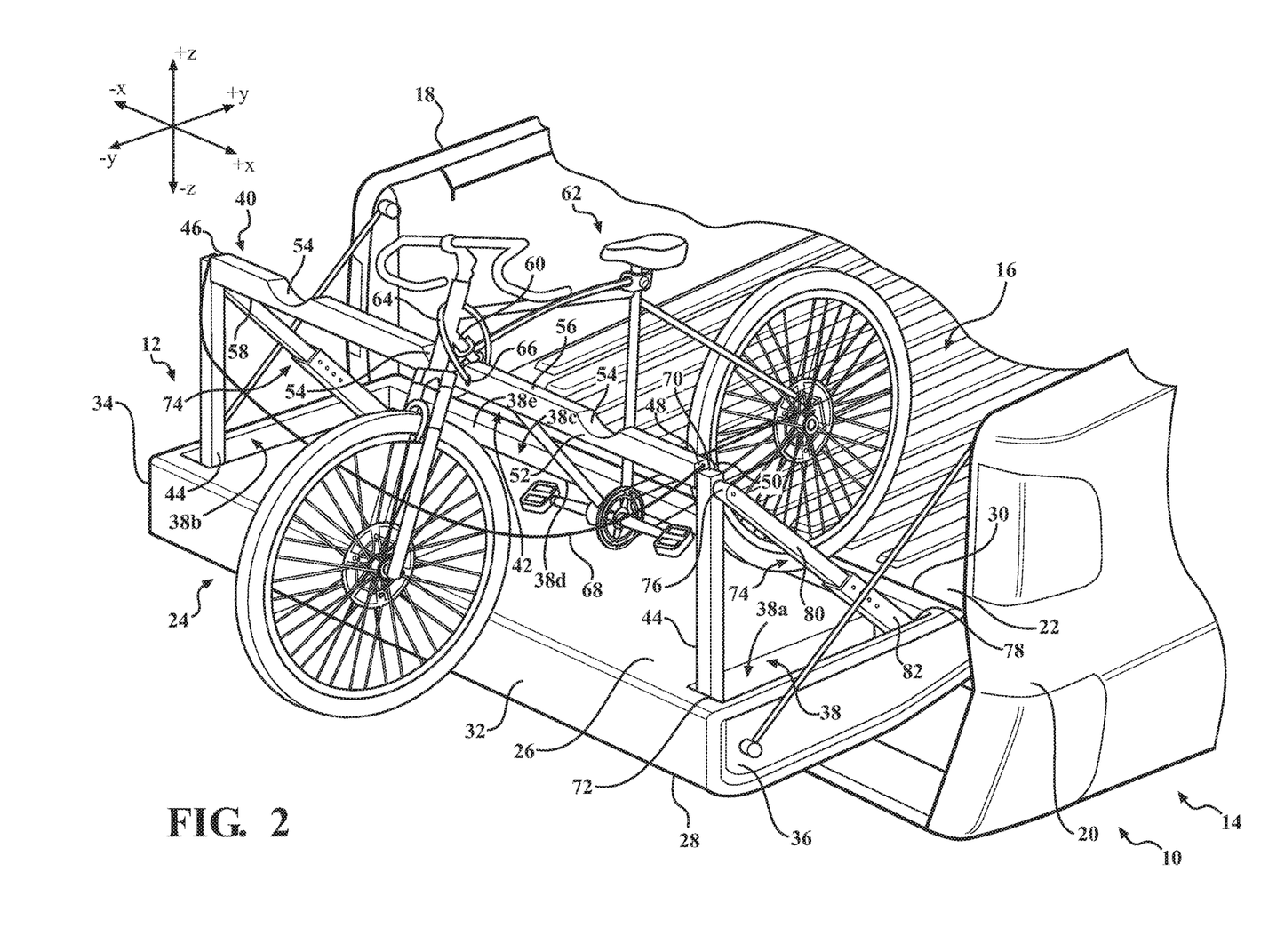
FIG. 2 schematically depicts a perspective view of the storage rack in a use position, support arms and a cross bar in an unfolded position, and locking arms in a support position according to one or more embodiments shown and described herein.

As shown in FIGS. 1 and 2, the storage rack assembly 12 includes a storage rack 40 integrated into the tailgate 24. The storage rack 40 is positionable between a stowed or folded position (FIG. 1) in which the storage rack 40 is provided within the recess 38 of the tailgate 24, and a use or unfolded position (FIG. 2) in which the storage rack 40 is positioned out of the recess 38 of the tailgate 24. The recess 38 corresponds to an outer shape of the storage rack 40 for receiving the storage rack 40 when in the stowed position. The storage rack 40 generally includes a crossbar 42 and a pair of support arms 44 for rotating the crossbar 42 away from the interior surface 26 of the tailgate 24 between a folded position in which the crossbar 42 and the support arms 44 are provided within the recess 38 (FIG. 1), and an unfolded position in which the crossbar 42 and the support arms 44 are outside of the recess 38 (FIG. 2). Thus, when the storage rack 40 is in the stowed position, the crossbar 42 and the support arms 44 are in the folded position, and when the storage rack 40 is in the use position, the crossbar 42 and the support arms 44 are in the unfolded position.

The crossbar 42 is an elongated member extending in the vehicle lateral direction and has a first end 46 and an opposite second end 48. In some embodiments, the crossbar 42 has a forward surface 50 and an opposite rear surface 52. The forward surface 50 faces the cargo space 16 when the storage rack 40 is in the use position and the tailgate 24 is in the open position, and faces the side wall 38e when the storage rack 40 is in the stowed position. In some embodiments, the forward surface 50 of the crossbar 42 is curved and the rear surface 52 of the crossbar 42 is flat such that the crossbar 42 has a D-shaped cross-section so that the crossbar 42 lies flush with the interior surface 26 of the tailgate 24 when the support arms are in the folded position and provided within the recess 38 of the tailgate 24. However, any suitable geometry of the crossbar 42 is contemplated and within the scope of the present disclosure.

In some embodiments, the crossbar 42 includes at least one notch 54 formed in a top surface 56 of the crossbar 42 extending toward an opposite bottom surface 58 of the crossbar 42. The top surface 56 and the bottom surface 58 extend between the first end 46 and the second end 48 of the crossbar 42 and the forward surface 50 and the rear surface 52 of the crossbar 42. The notch 54 is configured to receive, for example, an object such as a bicycle frame 60 of a bicycle 62, or any other suitable object, supported on the tailgate 24 and/or provided within the cargo space 16 of the vehicle 10. As such, the notch 54 may have a semicircular interior surface corresponding to the geometry of the bicycle frame 60. In some embodiments, a strap 64 may be attached to the crossbar 42 proximate the notch 54 to secure the bicycle frame 60 within the notch 54 and prevent the bicycle 62 from being removed from the crossbar 42. The strap 64 may have at least one detachable end 66 secured to the crossbar 42 using any suitable fastener such as, for example, a snap, a clasp, a hook/latch mechanism, or the like. In some embodiments, a plurality of notches 54 may be formed in the top surface 56 of the crossbar 42 and spaced apart from one another in the vehicle lateral direction for receiving a bicycle frame 60 within each notch 54 to support a plurality of bicycles 62 on the crossbar 42.

In some embodiments, the crossbar 42 includes a cable 68 for securing a plurality of bicycles 62 to the crossbar 42. The cable 68 may be fixed to one end of the crossbar 42 and attachable to an opposite end of the crossbar 42 using any suitable fastening mechanism such as, for example, a snap, a clasp, a hook/latch mechanism, or the like. In some embodiments, the cable 68 may be a retractable cable that retracts out of an end, such as the second end 48, of the crossbar 42 and securable to the first end 46 or any other portion of the crossbar 42 for securing a plurality of bicycles 62 thereto. In embodiments in which the cable 68 is retractable, the crossbar 42 may include a spool (not shown) or some other automatically retractable mechanism for automatically or selectively retracting the cable 68 within the crossbar 42 when a distal end of the cable 68 is not secured to the crossbar 42. In some embodiments, the cable 68 and/or the strap 64 may be locked and unlocked using a key to prevent removing of the bicycle(s) 62 by others.

Referring to FIG. 2, the storage rack 40 is shown including the pair of support arms 44 for supporting the crossbar 42 when the storage rack 40 is in the use position. Each support arm 44 includes a first end 70 secured to the crossbar 42 and an opposite second end 72 pivotally secured to the tailgate 24. In some embodiments, the first end 70 of each support arm 44 is attached to opposite ends 46, 48 of the crossbar 42. In other embodiments, the first end 70 of each support arm 44 is attached to some other portion of the crossbar 42 such as, for example, the rear surface 52 or the bottom surface 58 of the crossbar 42. As noted above, the second end 72 of each support arm 44 is pivotally attached to the tailgate 24 along an axis extending in the vehicle lateral direction.

As shown, the second end 72 of each support arm 44 is pivotally attached to the interior surface 26 of the tailgate 24. However, in some embodiments, the second end 72 of each support arm 44 may be pivotally attached to some structure within the tailgate 24 to provide additional support and the support arms 44 extend through the interior surface 26 of the tailgate 24. As such, the support arms 44 may be pivotally attached to either the bottom wall 38f or at least one of the side walls 38d, 38e of the recess 38. When the storage rack 40 is in the stowed position, as shown in FIG. 1, the forward surface 50 of the crossbar 42 is provided within the traversing portion 38c of the recess 38 and faces the side wall 38e of the recess 38, and the support arms 44 are provided within respective side portions 38a, 38b of the recess 38 and between the side walls 38d, 38e of the recess 38. When the storage rack 40 is in the use position, as shown in FIG. 2, the support arms 44 extend substantially perpendicular to the interior surface 26 of the tailgate 24. Although a pair of support arms 44 are shown provided on opposite ends 46, 48 of the crossbar 42, some embodiments may include only a single support arm 44 extending from a central portion of the crossbar 42. However, it should be appreciated that providing a pair of support arms 44 proximate opposite ends 46, 48 of the crossbar 42 provides increased support and stability to the crossbar 42.

The storage rack 40 may include at least one locking arm 74 for locking the support arm 44 in the unfolded position. The locking arm 74 is positionable between a folded position in which the locking arm 74 is provided within the recess 38, and a support or extended position in which the locking arm 74 extends at an acute angle relative to the support arm 44. The locking arm 74 is also positionable into an upright position in which the locking arm 74 is perpendicular to the interior surface 26 of the tailgate 24, and parallel to the support arms 44. When the locking arm 74 is in the upright position, the storage rack 40 is in an intermediate position between the stowed position and the use position. As described in more detail herein, when the locking arm 74 is in the support position, the locking arm 74 is operable between a locked state for prohibiting movement of the support arms 44 from the unfolded position toward the folded position, and an unlocked state for permitting movement of the support arms 44 between the unfolded position and the folded position.

As shown in FIG. 2, the locking arm 74 has a first end 76 pivotally attached to the support arm 44 or the crossbar 42, and an opposite second end 78 attachable to the tailgate 24. In some embodiments, the first end 76 of the locking arm 74 is pivotally attached to the second end 78 of the crossbar 42. However, in other embodiments, the first end 76 of the locking arm 74 may be attached to some other portion of the crossbar 42 in the vehicle lateral direction. In other embodiments, the first end 76 of the locking arm 74 may be pivotally attached to some portion of the support arm 44, such as the first end 70 of the support arm 44 or some other portion between the first end 70 and the second end 72 of the support arm 44. The second end 78 of the locking arm 74 may be attachable to the interior surface 26 of the tailgate 24. However, in some embodiments, the second end 78 of the locking arm 74 may be attachable to some structure within the tailgate 24 to provide additional support and the locking arm 74 may extend through the interior surface 26 of the tailgate 24.

As noted hereinabove, the locking arm 74 is operable between a locked state and an unlocked state when in the support position. In the locked state, the locking arm 74 inhibits movement of the crossbar 42 and the support arms 44 from the unfolded position to the folded position. In the unlocked state, the locking arm 74 permits movement of the crossbar 42 and the support arms 44 between the unfolded position and the folded position. The locking arm 74 may be operated into the locked state when the storage rack 40 is in the use position by securing the second end 78 of the locking arm 74 to the tailgate 24. This prevents movement of the storage rack 40 out of the use position. Alternatively, when the second end 78 of the locking arm 74 is unsecured from the tailgate 24 and in the unlocked state, the first end 76 of the locking arm 74 may pivot about the crossbar 42 or the support arm 44 and permit the storage rack 40 to be positioned into the intermediate position and, subsequently, into the stowed position within the recess 38 of the tailgate 24.

Although not shown, a second locking arm 74 may be provided on the opposite side of the storage rack 40 having a first end pivotally attached to the first end 46 of the crossbar 42 or the support arm 44, and an opposite second end attachable to the tailgate 24. Providing a pair of locking arms 74 ensures improved stability and support to maintain the support arms 44 in an upright position relative to the tailgate 24 and, thus, the storage rack 40 in the use position.

Referring now to FIG. 3, the storage rack 40 is shown in the stowed position with the locking arm 74 provided within the recess 38 of the tailgate 24. With the storage rack 40 in the stowed position, the support arms 44 and the crossbar 42 are also provided within the recess 38, although they are obstructed from view in FIG. 3 by the locking arm 74. When the storage rack 40 is in the stowed position, the thickness of the recess 38, which is defined by a height of the side walls 38d, 38e extending between the bottom wall 38f of the recess 38 and the interior surface 26 of the tailgate 24, is equal to or greater than a thickness of the storage rack 40. Thus, the storage rack 40 does not extend out of the recess 38. In some embodiments, the locking arm 74 is a telescoping arm having a length that may be adjusted when operated into the locked state. While the locking arm 74 may include any suitable telescoping or otherwise adjustable structure for providing an increased length when necessary, the locking arm 74 is shown including an inner member 80 including the first end 76 of the locking arm 74, and an outer member 82 including the second end 78 of the locking arm 74. The inner member 80 extends into an open end 84 of the outer member 82. The inner member 80 may include a spring-loaded pin 86 insertable into any one of a plurality of holes 88 formed in the outer member 82. As shown in FIGS. 3 and 4, the outer member 82 has four holes 88 formed therein and the pin 86 of the inner member 80 is extended through the lowest of the holes 88. By locking the pin 86 in the lowest hole 88, the locking arm 74 is adjusted to have the smallest possible length.

In some embodiments, once the storage rack 40 is in the intermediate position, as shown in FIG. 4, the second end 78 of the locking arm 74 is then moved into the support position and toward a locking mechanism 90 provided on the interior surface 26 of the tailgate 24 or within the recess 38 formed therein, as shown in FIG. 5. In order to maintain the upright and perpendicular orientation of the support arms 44, the length of the locking arm 74 must be extended to reach the locking mechanism 90. Thus, the pin 86 of the inner member 80 of the locking arm 74 is depressed so that the inner member 80 may be retracted from the outer member 82 to increase the length of the locking arm 74. As shown in FIG. 5, the inner member 80 is retracted out of the outer member 82 and the pin 86 of the inner member 80 is inserted into another hole 88, such as, for example, the first hole 88, to lock the inner member 80 in position relative to the outer member 82. Adjusting the position of the inner member 80 relative to outer member 82 to allow the pin 86 to be inserted through the first hole 88 provides the locking arm 74 with the greatest possible length.

Once the second end 78 of the locking arm 74 is positioned at the locking mechanism 90, the second end 78 of the locking arm 74 is locked to the locking mechanism 90 in any suitable manner. In some embodiments, the locking mechanism 90 is a block 92 having an aperture 94 formed therein. By aligning the aperture 94 of the block 92 with a receiving hole 96 formed in the second end 78 of the locking arm 74, a locking pin 98 may be inserted therethrough to lock the locking arm 74 to the block 92. In other embodiments, the locking mechanism 90 may include any other suitable locking structure for engaging the second end 78 of the locking arm 74 and maintaining the position of the locking arm 74 on the tailgate 24. For example, the locking mechanism 90 may include a moveable hook for engaging the locking arm 74.

In other embodiments, it is contemplated that the second end 78 of the locking arm 74 is pivotally attached to the tailgate 24 and the first end 76 of the locking arm 74 is selectively attachable and positionable along at least one portion of the support arm 44 or the crossbar 42. By detaching the first end 76 of the locking arm 74 from the support arm 44, the storage rack 40 may be positioned into the stowed position. Similarly, by attaching the first end 76 of the locking arm 74 to a portion of the support arm 44 or the crossbar 42, the storage rack 40 may be locked in the use position.

In some embodiments, the storage rack assembly 12 may include at least one actuator or motor for controlling operation of at least one of the storage rack 40 between the stowed position and the use position and, specifically, the support arms 44 between the folded position and the unfolded position, and the locking arm 74 between the upright position and the support position. As shown in FIG. 5, a motor 100 is provided at the second end 72 of the support arm 44 for controlling rotation of the support arm 44 between the folded position and the unfolded position. The motor 100 may be configured to rotate the support arm 44 in a first direction and out of the recess 38 of the tailgate 24 from the folded position to the unfolded position when it is desired to support the bicycle 62, as well as in a second direction opposite the first direction back into the recess 38 of the tailgate 24 and into the folded position. Additionally, the motor 100 may be configured to selectively rotate the support arm 44 to at least one intermediate position between the folded position and the unfolded position. Doing so reduces the distance between the crossbar 42 and the tailgate 24 and allows for a smaller bicycle to be supported on the tailgate 24 that would otherwise not be able to contact the vehicle 10. The motor 100 may be powered by a battery 102 either specific for the storage rack assembly 12 or the same battery used to power components of the vehicle 10. In some embodiments, the motor 100 may be operated by a user by operating any suitable controls, buttons, switches, or the like on the storage rack 40 itself or, in some embodiments, the controls may be provided within the vehicle 10, such as on a vehicle display having a user interface.

In some embodiments, the locking arm 74 may also be controlled by a motor or actuator for moving the locking arm 74 between the upright position in which the locking arm 74 is initially parallel with the support arm 44, and the support position. As shown in FIGS. 4 and 5, an actuator 104 is shown for moving the second end 78 of the locking arm 74 in a vehicle longitudinal direction along the tailgate 24 and within the recess 38. The actuator 104 may include any suitable mechanism such as, for example, a linear actuator including a drive screw such that rotation of the drive screw translates a trolley fixed to the second end 78 of the locking arm 74 and threadedly engages the drive screw. In other embodiments, the actuator 104 may include a rack provided within the recess 38 and a pinion gear provided at the second end 78 of the locking arm 74 for rotating the pinion gear and engaging the rack. In embodiments in which movement of the locking arm 74 is controlled by the actuator 104, it may be appreciated that the locking arm 74 may not include the spring-loaded pin 86 in the inner member 80 of the locking arm 74. Instead, the locking arm 74 may include an actuator for adjusting the length of the locking arm 74 in response to operation of the actuator 104 when moving the second end 78 of the locking arm 74. Thus, the length of the locking arm 74 is automatically adjusted to compensate for the position of the second end 78 of the locking arm 74. As with the motor 100 for controlling the support arms 44, the actuator 104 may be powered by either the battery 102 or the same battery used to power components of the vehicle 10. In addition, the actuator 104 may be operated by a user by operating any suitable controls, buttons, switches, or the like on the storage rack 40 itself or, in some embodiments, the controls may be provided within the vehicle 10, such as on the vehicle display.

Alternatively, although not illustrated herein, it should be appreciated that the storage rack 40 may be provided on the exterior surface 28 of the tailgate 24 or an exterior surface of any other suitable surface of the vehicle 10, such as a roof, without departing from the scope of the present disclosure. In addition, although the locking arm 74 is illustrated as extending in the +Y direction from the crossbar 42 and the support arm 44, it should be appreciated that the orientation of the storage rack 40 may be rearranged such that the locking arm 74 extends in the −Y direction from the crossbar 42 and the support arm 44 such that the crossbar 42 and the support arms 44 are located forward of the locking arm 74 in the vehicle longitudinal direction.

From the above, it is to be appreciated that defined herein is a storage rack assembly for supporting at least one object on a storage rack when in a stowed position and storing the storage rack within a tailgate when the storage rack is in a use position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage rack assembly comprising:
   a tailgate having a recess formed on an interior surface thereof, the recess defined by at least one wall; and
   a storage rack comprising:
      a crossbar; and
      a pair of support arms having a first end attached to the crossbar and an opposite second end pivotally attached to the at least one wall of the tailgate, the pair of support arms provided on opposite ends of the crossbar,
   wherein the storage rack is positionable between a stowed position in which the crossbar and the pair of support arms are positioned within the recess of the tailgate, and a use position in which the crossbar and the pair of support arms are positioned out of the recess of the tailgate.

2. The storage rack assembly of claim 1, further comprising at least one locking arm having a first end pivotally attached to at least one of the crossbar and the pair of support arms, and an opposite second end, the at least one locking arm operable between an unlocked state in which the second end of the at least one locking arm is unlocked to the tailgate, and a locked state in which the second end of the at least one locking arm is locked to the tailgate.

3. The storage rack assembly of claim 2, wherein the at least one locking arm is pivotally attached to the crossbar.

4. The storage rack assembly of claim 2, wherein the at least one locking arm is pivotally attached to one of the support arms of the pair of support arms.

5. The storage rack assembly of claim 2, further comprising a pair of locking arms, the first end of each locking arm of the pair of locking arms pivotally attached to opposite ends of the crossbar.

6. The storage rack assembly of claim 2, further comprising a pair of locking arms, each locking arm of the pair of locking arms pivotally attached to a support arm of the pair of support arms.

7. The storage rack assembly of claim 2, wherein the crossbar, the pair of support arms, and the at least one locking arm are flush with the interior surface of the tailgate when the storage rack is in the stowed position.

8. The storage rack assembly of claim 1, further comprising at least one notch formed in the crossbar, the at least one notch configured to receive a bicycle frame.

9. The storage rack assembly of claim 7, further comprising a plurality of notches spaced apart from one another in a vehicle lateral direction.

10. The storage rack assembly of claim 1, further comprising at least one strap for securing a bicycle frame to the crossbar.

11. The storage rack assembly of claim 1, further comprising a retractable cable extending from the crossbar and lockable to the crossbar for securing a plurality of bicycle frames to the crossbar.

12. The storage rack assembly of claim 1, further comprising an actuator for operating the storage rack between the stowed position and the use position.

13. The storage rack assembly of claim 1, wherein when in the use position, the pair of support arms are perpendicular to the interior surface of the tailgate.

* * * * *